(No Model.) 2 Sheets—Sheet 1.

J. LOWTH.
PUMP ATTACHMENT FOR VELOCIPEDES.

No. 510,036. Patented Dec. 5, 1893.

Witnesses:
J. Halpenny
George W. Underwood

Inventor:
James Lowth,
By his attorneys,
Gridley & Hopkins

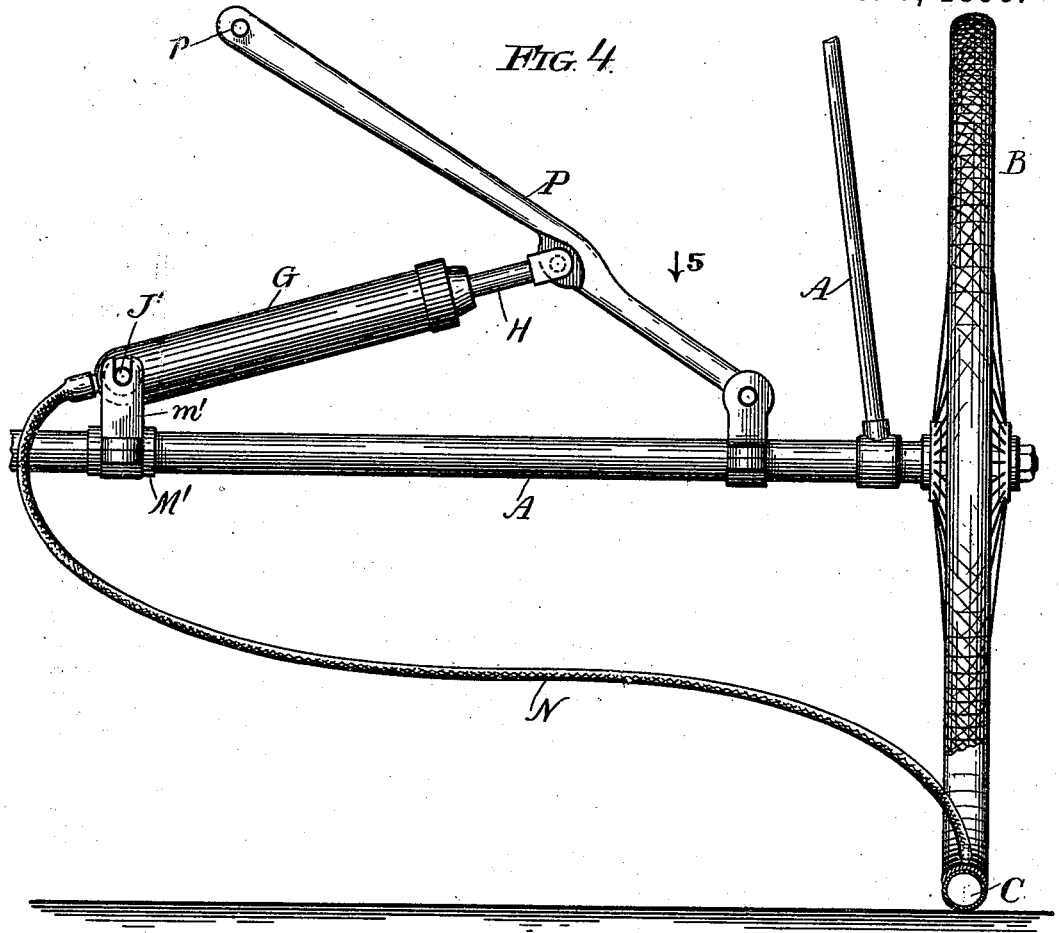
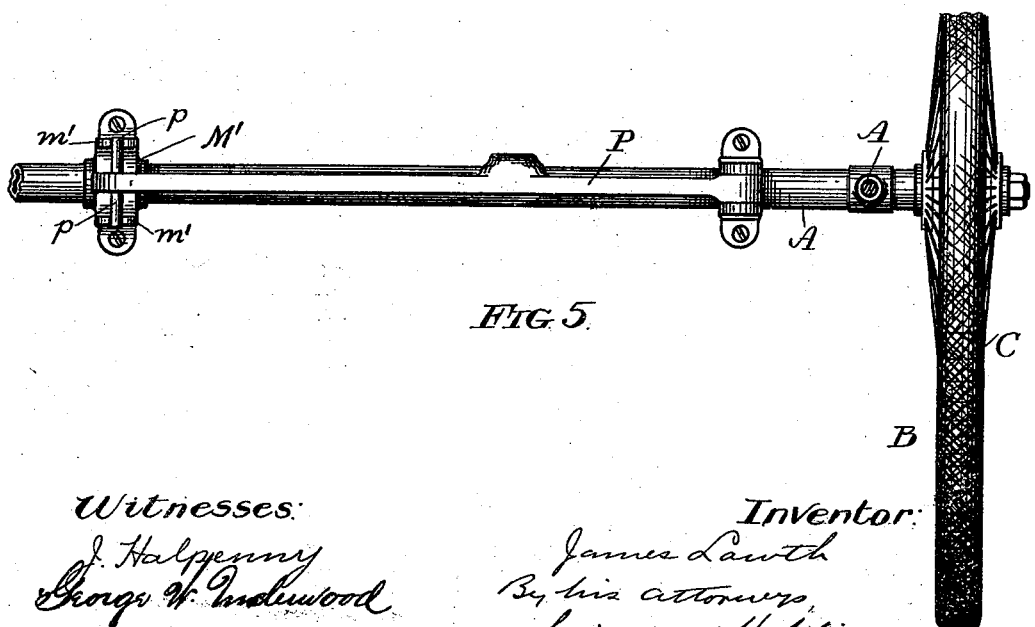

UNITED STATES PATENT OFFICE.

JAMES LOWTH, OF CHICAGO, ILLINOIS.

PUMP ATTACHMENT FOR VELOCIPEDES.

SPECIFICATION forming part of Letters Patent No. 510,036, dated December 5, 1893.

Application filed September 26, 1892. Serial No. 446,903. (No model.)

*To all whom it may concern:*

Be it known that I, JAMES LOWTH, a citizen of the United States, residing at Chicago, in the county of Cook and State of Illinois, have invented certain new and useful Improvements in Air-Pumps for Inflating the Pneumatic Tires of Vehicle-Wheels, of which the following is a specification, reference being had to the accompanying drawings, which are made a part hereof, and in which—

Figure 1:
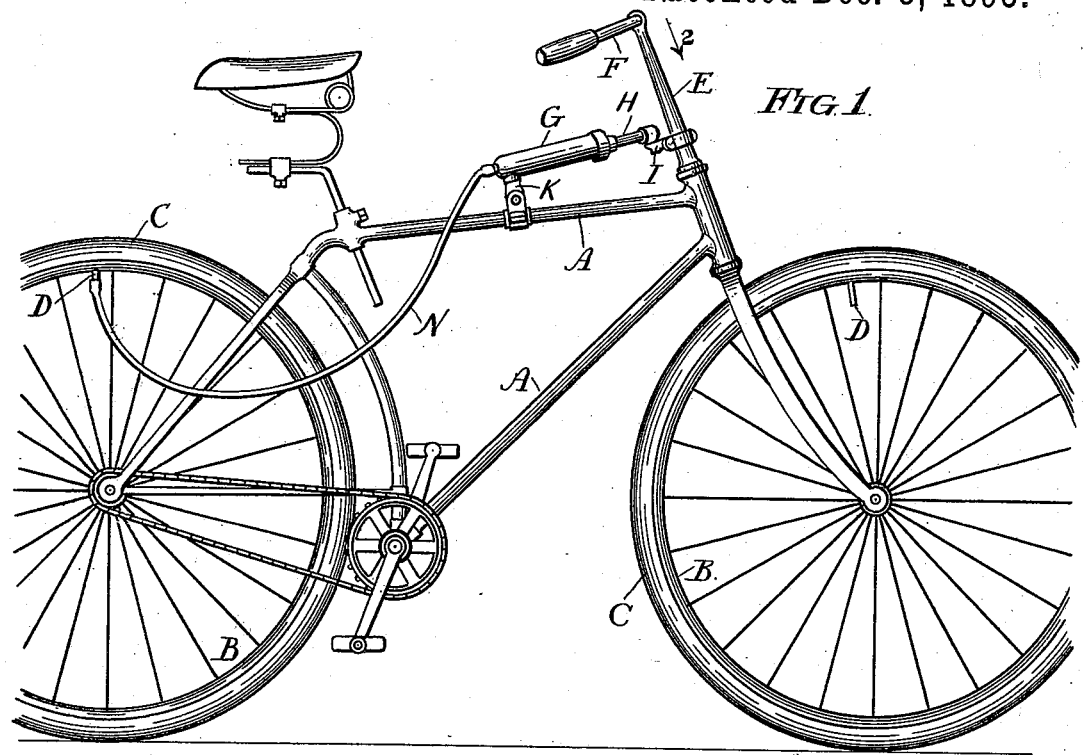
Figure 2:
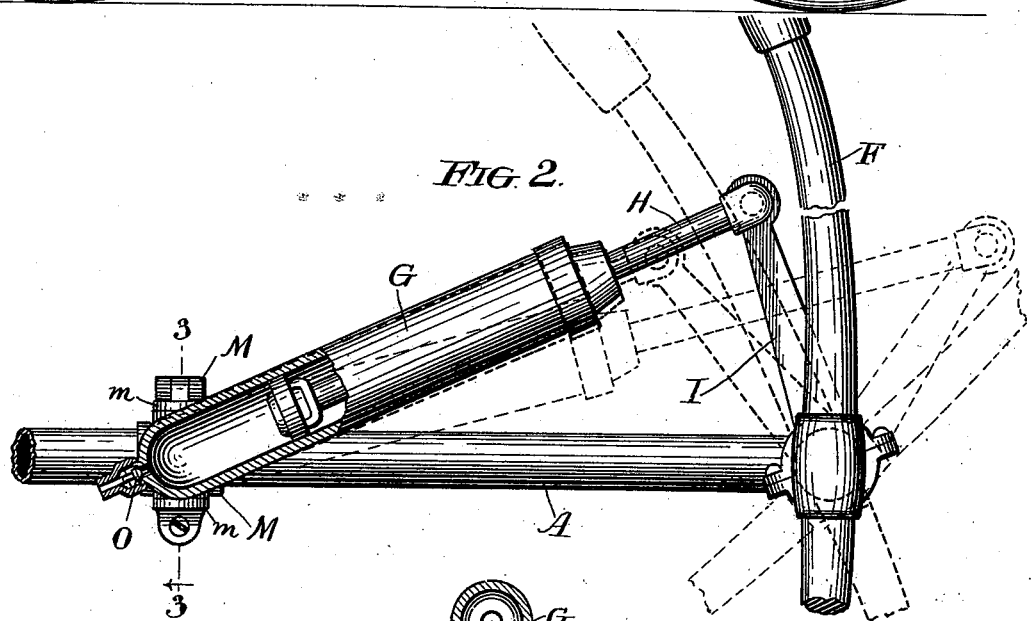
Figure 3:
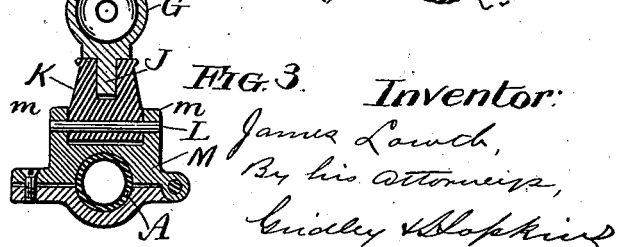

Figure 1, is a side elevation of a bicycle, the wheels of which are provided with pneumatic tires, and an air pump secured to a part of the machine, in accordance with the invention. Fig. 2, is a top view of the pump and of portions of the frame and handle-bar, on a somewhat larger scale, the parts being viewed in the direction indicated by the arrow in Fig. 1. Fig. 3, is a transverse section thereof, on the line 3—3, viewed in the direction indicated by the arrow. Fig. 4, is an elevation of portions of a vehicle, the wheels of which are provided with pneumatic tires, and of an air pump secured to a part of the vehicle, in accordance with the invention, the arrangement being somewhat different from that shown in the preceding figures. Fig. 5, is a plan view thereof, excepting the pump cylinder, piston-rod, and the tube for connecting the pump with the nipple of the tire, the operating lever being shown in an out of the way position.

The pneumatic tires, that are so extensively used for the wheels of vehicles of various kinds, and especially bicycles, must be inflated from time to time, and the present practice is for the rider to carry in his pocket, or tool-box, a small air pump, which may be connected with the nipple of the tire, by means of a tube. The handle of this pump forms a continuation of the piston-rod, and the pump is operated very much as a syringe is operated, the cylinder being grasped with one hand and the handle with the other. With such a pump, it is not possible to produce the required pressure within the tire, and the object of the present invention is to provide means whereby this can be accomplished, with ease and facility. To this end, I removably attach the pump cylinder to some convenient part of the vehicle, by some means that will enable its ready attachment for use, and removal for carrying it when not in use, and I connect its piston-rod with a lever, which is fulcrumed to some convenient part of the vehicle and is of sufficient length to enable the operator to easily produce as much pressure as is necessary. So far as I am aware, I am the first to removably attach a pump to a vehicle in any such manner, and I therefore desire to have it understood that my invention, in its broad aspect, is not limited to details in the construction of the pump or any of its accessories; nor is it limited to details in the construction of the means for attaching the pump and its accessories to the vehicle; nor is it limited, in its application, to vehicles of any particular description, so long as their wheels are provided with pneumatic tires; nor is it limited to the securing of the pump, or its accessories, to any particular part of the vehicle.

The novel features in which the invention resides, are particularly pointed out in the claims, and I will now describe in detail the said invention and some of the many possible ways of applying it.

Wherever seen in the drawings, A represents the frame of the vehicle, or portions thereof; B, represents the wheel thereof; C, the pneumatic tire, and D, the inflating nipple, all of which parts may be of any desired construction and varied at pleasure, without in any way touching the merits of the present invention.

In Figs. 1 and 2, E represents the steering rod of the bicycle; F, the handle bar attached thereto, in the customary manner; G, the pump cylinder secured to the frame; H, the piston-rod, and I, an arm, one end of which is loosely jointed to the piston-rod, while the other is secured to the steering rod E. The cylinder is provided on one side, with a cylindrical stud or trunnion, J, which fits in a socket made for it in a block K, the latter being mounted upon a pivot-pin L, which is in turn supported by ears *m*, formed on a clip M, that clamps the frame. The axis of the trunnion J, is perpendicular to the axis of the pin L, and hence, the pump cylinder is capable of universal movement. This form of universal connection between the pump and frame, is perfectly satisfactory, so far as its operation is concerned, but it is not the cheapest form that could be devised, and if desired, it may be superseded by a connection of any other construction, that will allow whatever lateral movement the cylinder requires during the operation of the pump.

The pump is connected with the nipple of the tire, by means of a tube N, and a check-valve O, is provided for preventing back pressure in the cylinder. If, when the pump is thus arranged, the handle bar be moved from side to side, so as to produce an oscillatory movement of the steering-rod, such as is produced in steering the machine, the parts will move alternately to and from the positions indicated by dotted line, and the piston of the pump will be reciprocated, with customary results. With this arrangement, the handlebar, a portion of the steering-rod, and the arm I, together, make up a lever for operating the pump, and by reason of the great length of the handle-bar and the very much less length of the arm I, the operator is enabled to exert upon the piston all the pressure that is necessary, in order to compress the air within the tire to the required extent. Another thing that assists in increasing the power, is the relative arrangement of the pump and the arm I. They are arranged similarly to the two parts of a toggle-joint, and in operation, the effect of bringing them into line with each other, is similar to the effect of straightening a toggle, so that with a lever even very much shorter than the handle-bar of a bicycle, this arrangement will enable the operator to bring great pressure to bear upon the air. In this form of the invention, the handle-bar is used, not because a lever of its length is necessary, but because it is a necessary part of every bicycle, and is, therefore, always present and in readiness for use. On vehicles other than bicycles, any other movable part may be used with the same facility, and whatever this part may be, or wherever it may be located to rig up a suitable connection between it and the piston-rod, requires only the skill of a mechanic. Instead, however, of thus utilizing a part of the vehicle and incorporating it in the operating mechanism of the pump, an entirely separate and distinct operating lever may be used. An example of such a lever is shown at P, in Figs. 4 and 5, fulcrumed to some convenient part of the vehicle—say the axle. As here shown, the pump cylinder has two trunnions J', which are fulcrumed in ears m', of a clip M', so that the cylinder may oscillate as the pump is operating. Here we have the same toggle action as with the arrangement shown in Figs. 1 to 3, but the connection between the cylinder and vehicle does not permit a universal movement of cylinder, because a universal movement is not necessary. With the arrangement shown in Figs. 1 to 3, a movement about the pivot pin L is necessary, because the axis of motion of the arm I is not parallel with the axis of the trunnion J, but by making these two axes parallel with each other (as they are in Figs. 4 and 5) the need for a movement of the cylinder in more than one plane, is done away with.

In both forms of the invention, the pump cylinder is detachably connected with the vehicle, and the piston-rod is detachably connected to its operating lever, so that when not in use these parts may be removed and put away. As shown in Figs. 4 and 5, the operating lever P, is provided with lateral projections $p$, which, when the cylinder is removed, occupy the trunnion bearings in the ears $m'$, as shown by Fig. 5.

I am aware that velocipedes having pneumatic tires have been provided with pumps for inflating said tires, said pumps being permanently attached to some part of the machines, and so arranged with relation to the wheels that they are operated automatically as the wheels revolve. Such is not the equivalent of my invention, which relates to a pump, not automatic in its character, but intended to be operated by hand whenever the tire needs inflation, said pump being attached to the machine by some means that will enable its ready removal so that it may be carried in the pocket or tool bag when not in use.

Having thus described my invention, what I claim as new therein, and desire to secure by Letters Patent, is—

1. The combination with a vehicle having a wheel provided with a pneumatic tire, of a pump pivotally supported by a part of the vehicle, a tube connecting the pump cylinder with the tire of the wheel, and an operating lever fulcrumed to a part of the vehicle and loosely connected to the piston rod of the pump, the pump and one arm of the operating lever being arranged similarly to a toggle joint, so that during the compression stroke they approach a straight line, substantially as set forth.

2. The combination with a velocipede, having a wheel provided with a pneumatic tire, and having also a handle bar, of a pump supported by a part of the machine, a tube connecting the pump cylinder with the tire of the wheel, and means connecting the pump piston with the handle-bar, substantially as set forth.

3. The combination with a velocipede having a wheel provided with a pneumatic tire, a handle bar, and a steering rod, to which said handle bar is secured, of a pump supported by a part of the machine, an arm secured to and projecting from the steering rod, and means connecting said arm with the piston of the pump, substantially as set forth.

4. The combination with a velocipede having a wheel provided with a pneumatic tire, of a pump, a universal joint between said pump and a part of the machine, a tube connecting the cylinder of the pump with the tire of the wheel, and means for operating the piston of the pump, substantially as set forth.

JAMES LOWTH.

Witnesses:
L. M. HOPKINS,
J. HALPENNY.